No. 695,257. Patented Mar. 11, 1902.
T. S. WILKIN.
BAND SAW WHEEL.
(Application filed Dec. 30, 1901.)
(No Model.)
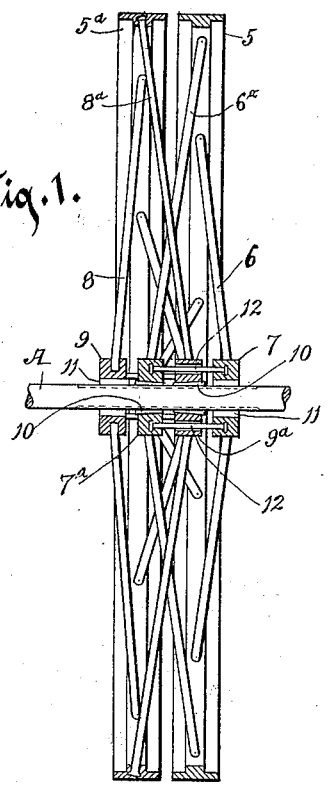
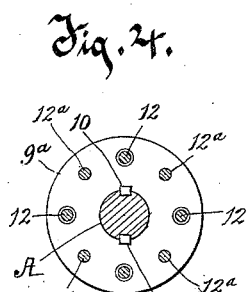
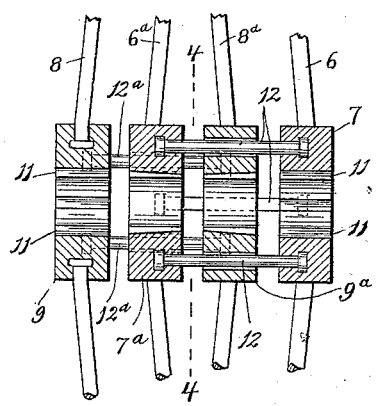
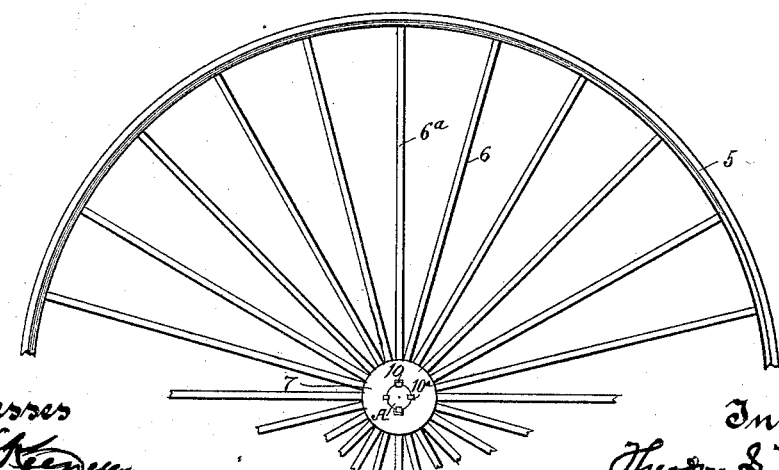
Witnesses
Inventor.
Theodore S. Wilkin
By Benedict Morsell
Attorneys
THE NORRIS PETERS CO., PHOTO-LITHO., WASHINGTON, D. C.

UNITED STATES PATENT OFFICE.

THEODORE S. WILKIN, OF MILWAUKEE, WISCONSIN.

BAND-SAW WHEEL.

SPECIFICATION forming part of Letters Patent No. 695,257, dated March 11, 1902.

Application filed December 30, 1901. Serial No. 87,678. (No model.)

*To all whom it may concern:*

Be it known that I, THEODORE S. WILKIN, residing at Milwaukee, in the county of Milwaukee and State of Wisconsin, have invented a new and useful Improvement in Band-Saw Wheels, of which the following is a description, reference being had to the accompanying drawings, which are a part of this specification.

My invention relates to a band-saw wheel adapted to be employed in a sawmill to carry thereon an endless saw. In use two of these wheels are employed for carrying the endless saw which runs over them, respectively at the upper and lower ends of its route of travel. My improved wheel is especially adapted for use for carrying those band-saws that are provided with teeth on both their edges. As these teeth are worn by use they are again sharpened by filing, and thereby the saw is made somewhat narrower with each sharpening. The teeth of these double-edged saws should project beyond the edges of the rims of the wheels on which they are carried, and it results that it is desirable that the rims of the wheels should be brought near to each other from time to time as the saw becomes narrower by wear and sharpening, and my improved wheel is so constructed that it can be narrowed or adjusted as to width of the rim thereof, so as to adapt it to the width of the saw.

The invention consists of the improved wheel, its parts, and combinations of parts, as herein described and claimed, or the equivalents thereof.

In the drawings, Figure 1 is a transverse central section of my improved band-saw wheel. Fig. 2 is an end view of a fragment of the wheel. Fig. 3 is a transverse section of the hub of the wheel. Fig. 4 is a transverse section of the hub of the wheel on line 4 4 of Fig. 3 looking toward the right.

It is proper to say that in use band-saw wheels for this purpose are commonly about eight feet in diameter, and the rim of the wheel is approximately eleven inches in width.

In the drawings, A represents a shaft on which the band-wheel is adapted to be mounted. The improved band-wheel having a rim adapted to be adjustable in width is composed of two members adjustable toward and from each other on the shaft. The rim 5 of one member is mounted on two sets of oppositely obliquely disposed spokes 6 and $6^a$, the spokes 6 being fixed in a hub member 7 and the spokes $6^a$ being fixed in a hub member $7^a$. The similar and complementary rim $5^a$ is mounted on two sets of reversely obliquely disposed spokes 8 and $8^a$, which spokes, respectively, are fixed in the hub members 9 and $9^a$. The hub member $9^a$ is located between the hub member 7 and the hub member $7^a$, and there is such space between the hub members 7 and $7^a$ as to permit of the necessary movement of the hub member $9^a$ along on the shaft to permit of the desired adjustment of the rims 5 and $5^a$ toward and from each other. The construction also includes the location of the hub $7^a$ between the hub members 9 and $9^a$, with capability of movement along on the shaft corresponding with the movement of the hub member $9^a$. These hubs are all adapted to be mounted on a shaft A and are provided with keyways for receiving keys 10 $10^a$ therein for locking them in position on the shaft. The keys 10 $10^a$ required to secure the hub members $7^a$ and $9^a$ to the shaft are placed in position by being passed through channels 11 11 therefor in the outer hub members 7 and 9. The hub members 7 and $7^a$ are held apart by distance-pieces 12 12, which are fixed to the hub members 7 and $7^a$. These distance-pieces 12 12 pass loosely through the intervening hub member $9^a$ in apertures therefor, and like distance-pieces hold the hubs 9 and $9^a$ apart, passing loosely through the intervening hub member $7^a$. In Fig. 1 and also as relates to the hub as shown in Fig. 3 the rims 5 and $5^a$ are shown in relative position of medium adjustment, so that by moving their respective hubs on the shaft the rims can be moved toward or from each other to the extent of the movement permitted to the intermediate hub members on the shaft.

Because of the peculiar and novel construction of this wheel it is advisable to build it by casting the rims 5 and $5^a$ on the spokes, and when these have cooled to a certain degree then casting the hubs onto the spokes, the distance-pieces keeping the hub members 9 $9^a$ from closing together and the distance-pieces 12 12ᵃ keeping the hub members 7 and 7ᵃ from closing together while the hubs are shrinking and pulling inwardly on the spokes, which are set at oblique angles and require tension, but would receive none from the shrinking of the hubs if they were allowed to come toward each other.

The foregoing is the preferable or advisable method of constructing the wheels; but my invention is not limited to this method or process of building them, as the rims, spokes, and hubs could by special care be cast integral and concurrently.

My improved wheels are not only adapted for the narrowing and widening of the rims of the wheels by adjustment, but by reason of the reversely-oblique directions of the spokes in each wheel and the adjustment of the wheels on the shaft a maximum of strength is obtained against radial and lateral overthrow strain thereon.

What I claim as my invention is—

1. A band-saw wheel comprising two complete complementary wheel members each wheel member having a plurality of hub members, a hub member of each wheel member being interposed between the hub members of the other wheel member.

2. A band-saw wheel, comprising two complete complementary wheel members each wheel member having a plurality of hub members, a hub member of each wheel member being interposed between hub members of the other wheel member, and distance members securing the separated hub members of one wheel member from each other rigidly, the distance members extending past an interposed hub member of the other wheel.

3. A band-saw wheel, comprising two complete complementary wheel members each wheel member having a plurality of hub members, a hub member of each wheel member being interposed between hub members of the other wheel member, and means for securing the hub members to a shaft adjustably.

4. In combination, a shaft, a band-saw wheel comprising two complete complementary wheel members, each wheel member having two separated hub members, a member of the hub of one wheel member being interposed between the separated hub members of the other wheel member, and means securing the hub members adjustably to the shaft.

In testimony whereof I affix my signature in presence of two witnesses.

THEODORE S. WILKIN.

Witnesses:
C. T. BENEDICT,
ANNA V. FAUST.